United States Patent [19]
Paget

[11] 3,758,815
[45] Sept. 11, 1973

[54] SUPPLEMENTAL ENERGY STORAGE CIRCUIT FOR ARC DISCHARGE LAMPS

[75] Inventor: Fredrick W. Paget, Rockport, Mass.

[73] Assignee: GTE Sylvania Incorporated, Danvers, Mass.

[22] Filed: Jan. 4, 1972

[21] Appl. No.: 215,292

[52] U.S. Cl. ................. 315/101, 315/176, 315/105
[51] Int. Cl. ............................................. H05b 39/00
[58] Field of Search ....................... 315/101, 86, 87, 315/105, 200, 205, 176, 272, 273

[56] References Cited
UNITED STATES PATENTS
| | | | |
|---|---|---|---|
| 3,096,464 | 7/1963 | Lemmers | 315/105 |
| 3,353,062 | 11/1967 | Nuckolls | 315/205 X |
| 3,233,148 | 2/1966 | Lake | 315/200 R |
| 3,155,875 | 11/1964 | Wenrich et al. | 315/205 X |
| 3,170,084 | 11/1965 | Retzer | 315/205 X |

Primary Examiner—Nathan Kaufman
Attorney—Norman J. O'Malley and James H. Grover

[57] ABSTRACT

A ballast circuit for a tungsten-iodide short arc discharge lamp has, in addition to an alternating current full wave rectifier bridge supplying low voltage operating current to the lamp, a capacitor-diode bridge circuit whose discharge characteristic of voltage multiplying and low current is controlled so that discharge occurs while the rectifier bridge is approaching or at zero volts, at the time in each alternating current half cycle when it is needed to promote arc striking or prevent extinction of an arc.

10 Claims, 3 Drawing Figures

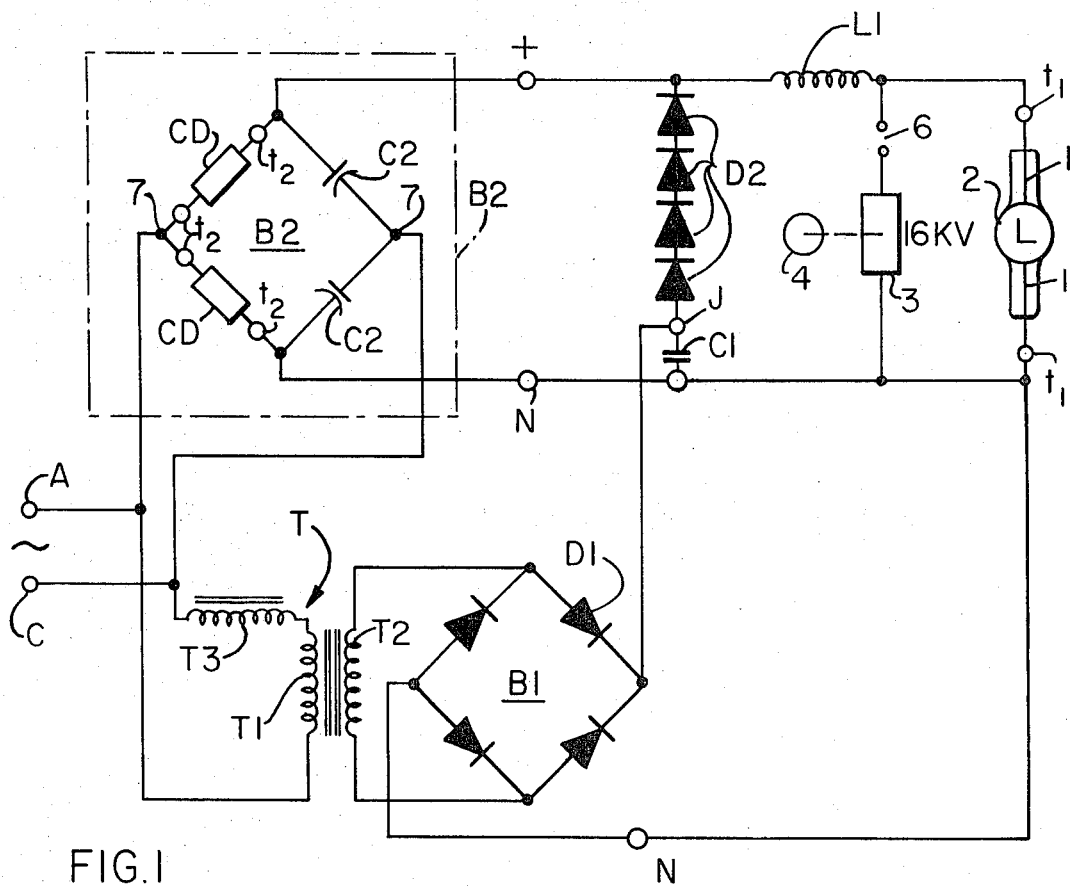
FIG.1
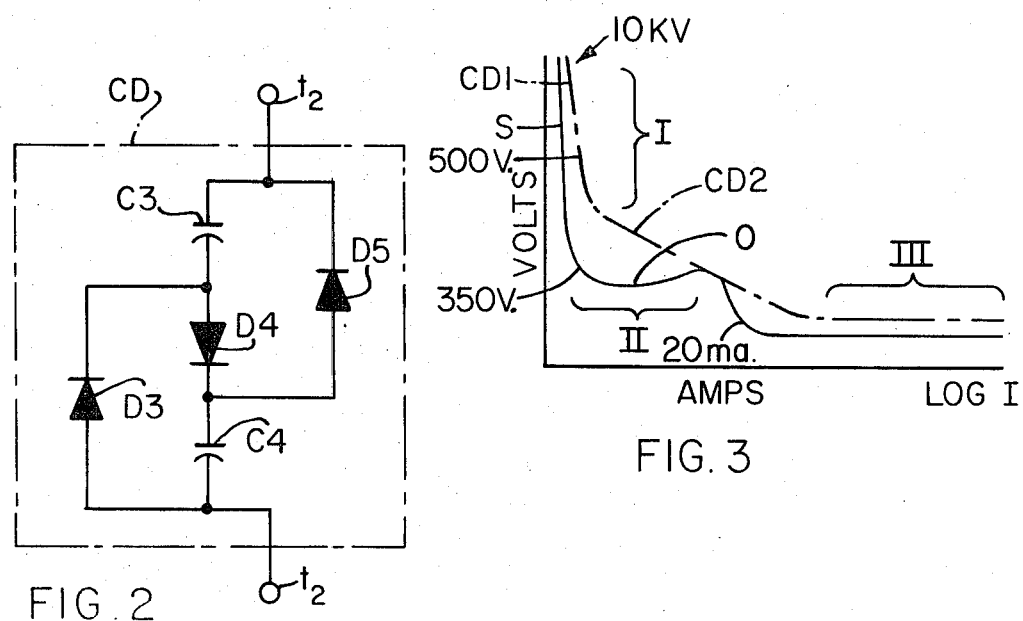
FIG.2
FIG.3

SUPPLEMENTAL ENERGY STORAGE CIRCUIT FOR ARC DISCHARGE LAMPS

BACKGROUND OF THE INVENTION

Arc discharge lamps such as fluorescent lamps and short arc lamps during starting after ionization go through a glow phase requiring an applied voltage which is high relative to the voltage for steady operation. During the glow phase, and also while operating, the low alternating voltage applied by a ballast provides insufficient energy to start or maintain arc discharge while the AC line voltage goes through zero volts. This alternation through zero volts may retard striking of a full emitting arc, or cause an operating arc to extinguish or tend to extinguish during part of each cycle of alternation.

Full wave rectifiers have been used as voltage multipliers for arc discharge lamp supply and to charge a large capacitance across the bridge output for storing peak energy and discharging it through the lamp as the line voltage passes through zero. A large peak current is drawn in charging the capacitance which must be large physically to stand the peak voltage and ripple current from the bridge. And after the peak of voltage most of the storaged energy discharges through the lamp when it does not need it during most of each half cycle supply from the bridge. Furthermore the capacitance across the bridge or line output requires high peak charging voltages which are quickly discharged.

Thus one object of the present invention is to provide a circuit for storing and supplying arc maintaining energy to an arc discharge lamp during passage of the line voltage through zero, which requires only moderate capacitance and relatively low peak supply voltage. A further object is to provide a circuit which stores its energy until needed when the line current approaches zero.

STATEMENT OF INVENTION

According to the invention an energy storage circuit for supplementing an alternating current power supply for an arc discharge lamp comprises a bridge having input terminals for connection to the alternating current supply and output terminals for connection to the lamp, and four arms connected between the terminals, at least two adjacent arms of the bridge in series between the output terminals each comprising a network of capacitances and diodes, at least two capacitances being connected in series with each other and an intermediate diode, and the remaining diodes each being connected in parallel with a different capacitance and an intermediate diode.

DRAWING

FIG. 1 is a schematic diagram of a ballast for a short arc lamp;

FIG. 2 is a schematic diagram of a part of the circuit of FIG. 1; and

FIG. 3 is a graph on non-linear scale of operating voltage versus current drawn by the short arc lamp of FIG. 1.

DESCRIPTION

Shown in FIG. 1 is an electronic ballast circuit for a metal-halide short arc lamp L such as a Sylvania type 300/16 Colorarc tungsten-iodide lamp having terminals $t1$ connected to discharge electrodes 1 within an envelope 2.

FIG. 3 shows in solid line the three phase I, II and III starting characteristic of a Colorarc lamp. In phase I a low current, high voltage, e.g. 10 kilovolts, impulse is required to ionize the lamp. Thereafter at about 350 volts it maintains a glow phase II until its voltage drops to about 20 volts and it begins operating in phase III at full current drawing about 8 amperes.

In the circuit of FIG. 1 the kilovolt energy impulse of phase I is supplied by a mechanical piezoelectric igniter 3 having a manual activator 4 and a spark gap 6, such as Panasonic-Matsushita Electric igniter No. EF1-AA21. This voltage is adequate to ionize the Metalarc lamp and initiate its starting phase I shown on the solid line curve S of FIG. 3.

For the glow and operating phases II and III the ballast circuit of FIG. 3 has two bridges B1 and B2 supplied by a transformer T. The transformer has a primary T1 with input terminals A and C for 120 volt, 60 hertz line voltage. A 40 volt secondary winding T2 delivers 40 volts to conventional full wave rectifier bridge B1 comprising four diodes D1 of type 1N1204. The bridge B1 delivers 55 volts between a positive bus at the junction J of a filter capacitor C1 and a chain of four type 1N1204 diodes D2. The filter capacitor and diode chain are connected between the lamp terminals, isolated from the igniter 3 by a 50 microhenry choke L1. This first bridge B1 provides relatively low voltage (e.g., 55 volts) high current (e.g., 10 amperes) energy for the operating phase III of the lamp L.

A second bridge B2 has input junctions 7 connected to the AC line terminals A and C, a negative bus N common with the negative bus N of the first bridge B1, and a positive bus +. Connected between these output busses in the four arms of the bridge are a pair of 1 microfarad capacitors C2 and a pair of capacitor-diode networks CD each with terminals $t2$. As shown in FIG. 2 each CD network comprises two 10 microfarad electrolytic capacitors C3 and three type 1N4004 diodes D3, D4 and D5 with a breakdown voltage of 400 volts. The capacitors C3 and one intermediate diode D4 are in series, with each of the additional diodes D3 or D5 in parallel with a different capacitor C3 and an intermediate diode. Any number N of two or more capacitors may be used, the number of diodes being 3(N−1). Each of the CD network capacitors C3, C4 in each bridge arm charges to one-half the 170 peak line voltage during each half cycle, holding this charge and discharging in series with the capacitors in the other CD bridge arm which are charging on the other half cycle. The open circuit output of the CD arms is triple the peak line input voltage, two thirds of the open circuit voltage coming from the four capacitors and one third from the line voltage. The CD networks can be used in all four arms of the bridge B2, but as shown the two capacitors C2 in the other arms of the bridge double the tripled voltage, giving an output six times the peak input voltage, in this case an open circuit voltage of 1,000 volts from a peak input line voltage of 170 volts (120 volts rms).

More significant than the voltage multiplying of the capacitor-diode bridge just described is its charge and discharge characteristic. The capacitors of the CD networks are charged at the high point of the applied AC voltage wave and then blocked off until they discharge at lower line voltage. There is no discharge during the intermediate time which would waste stored energy. In contrast with the capacitance hitherto used across the output of the full wave recifier bridge B1 which leaks most of its energy through the lamp L while high voltage is available from the rectifier bridge, the present CD network bridge B2 releases its stored energy to the lamp L only at the time when it is needed to sustain the arc, namely when the line voltage is passing through zero and the full wave rectified bridge current is approaching or at zero. Moreover as shown at portions CD1 and CD2 of the dot-dash wave of FIG. 3 the multiplier bridge B2 discharges at highest voltage CD1 above the solid line operating voltage requirement during phase I of the lamp, but at low current. In the glow phase II of the lamp the bridge B2 discharge curves starts to level off (CD2) but remains above lamp requirement and at low current, hence low energy loss, until the rectifier bridge assumes the supply requirements in phase III.

It should be understood that the present disclosure is for the purpose of illustration only and that this invention includes all modifications and equivalents which fall within the scope of the appended claims.

I claim:

1. An energy storage circuit for supplementing an alternating current power supply for an arc discharge lamp comprising:
a bridge having input terminals for connection to the alternating current supply and output terminals for connection to the lamp, and four arms connected between the terminals, at least two adjacent arms of the bridge in series between the output terminals each comprising a network of capacitances and diodes, each network including at least two capacitances connected in series with each other and an intermediate diode, and at least two remaining diodes each connected in parallel with a different capacitance and an intermediate diode of said series.

2. A circuit according to claim 1 wherein each network comprises N capacitances and 3 (N−1) diodes.

3. A circuit according to claim 1 wherein N equals 2.

4. A circuit according to claim 1 wherein two of the bridge arms each comprise the aforesaid capacitance-diode network and two arms each comprise a capacitance.

5. A circuit according to claim 1 wherein said alternating current supply comprises a rectifier bridge having alternating current input terminals and output terminals, the first said bridge having its input terminals connected to the alternating current input terminals, and the output terminals of the respective bridges being connected in parallel to supply connectors for an arc discharge lamp.

6. A circuit according to claim 5 wherein a metal-halide arc discharge lamp is connected between said connectors.

7. A circuit according to claim 5 wherein two of the bridge arms comprise the aforesaid capacitance-diode network and two arms comprise a capacitance.

8. A circuit according to claim 1 in combination with an alternating current supply comprising a rectifier bridge having alternating current input terminals and output terminals, the first said bridge having its input terminals connected to the alternating current input terminals, and the output terminals of the respective bridges being connected in parallel to supply connectors for an arc discharge lamp.

9. A circuit according to claim 1 in combination with a kilovolt pulse supply for igniting the lamp arc.

10. A circuit according to claim 9 wherein the kilovolt supply comprises a mechanical piezoelectric device.

* * * * *